United States Patent
Bright

(10) Patent No.: US 8,548,176 B2
(45) Date of Patent: Oct. 1, 2013

(54) APPARATUS INCLUDING MICROPHONE ARRANGEMENTS

(75) Inventor: Andrew P. Bright, Helsinki (FI)

(73) Assignee: Nokia Corporation, Espoo (FI)

( * ) Notice: Subject to any disclaimer, the term of this patent is extended or adjusted under 35 U.S.C. 154(b) by 631 days.

(21) Appl. No.: 12/364,669

(22) Filed: Feb. 3, 2009

(65) Prior Publication Data

US 2010/0195838 A1 Aug. 5, 2010

(51) Int. Cl.
*H04M 1/19* (2006.01)

(52) U.S. Cl.
USPC .............. 381/92; 381/66; 381/365; 455/563; 455/575.1

(58) Field of Classification Search
USPC .................. 381/66, 92, 365; 455/563, 575.1
See application file for complete search history.

(56) References Cited

U.S. PATENT DOCUMENTS

| | | | |
|---|---|---|---|
| 2007/0252674 A1* | 11/2007 | Nelson et al. | 340/5.53 |
| 2008/0163686 A1* | 7/2008 | Carr | 73/514.26 |
| 2009/0111507 A1* | 4/2009 | Chen | 455/550.1 |
| 2010/0081487 A1* | 4/2010 | Chen et al. | 455/575.1 |

* cited by examiner

*Primary Examiner* — Marcos D. Pizarro
*Assistant Examiner* — Tifney Skyles
(74) *Attorney, Agent, or Firm* — Banner & Witcoff, Ltd.

(57) ABSTRACT

An apparatus includes first and second microphone arrangements, arranged to output first and second signals respectively and is operable in a first mode and a second mode. In the first mode, an output signal is generated based on the second signal and a third signal, where the second signal and, optionally, the first signal, can be used to compensate for ambient noise, for example, for noise cancellation when a telephone call is relayed through a speaker. In the second mode, an output signal is generated based on the first and second signals. In this manner, the combination of the first and second microphone arrangements provides a directional sensitivity that can pick up sound from a remote source, for example, in an audio or video recording session. The apparatus may include a sensor to allow automatic switching between one or more of modes, directional sensitivity patterns and types of recording session.

25 Claims, 6 Drawing Sheets

APPARATUS INCLUDING MICROPHONE ARRANGEMENTS

FIELD OF THE INVENTION

The invention relates to an apparatus having first and second microphone arrangements.

BACKGROUND OF THE INVENTION

Recently, there has been a trend towards providing multi-functional electronic devices. For instance, devices such as mobile telephones have been developed that include video and/or audio recording capability. Such functionality requires the provision of microphones to pick up speech or other sounds. Typically, the microphones provided on such devices have a low sensitivity, requiring the device to be placed need the source being recorded.

SUMMARY OF THE INVENTION

In embodiments of the invention, an apparatus includes a first microphone arrangement, including at least one first microphone and arranged to output a first signal, a second microphone arrangement, including at least one second microphone and arranged to output a second signal, and a processor arranged to generate an output signal based on the first and second signals. The apparatus is operable in a first mode and a second mode. In the first mode, the processor is arranged to generate the output signal based on the second signal and a third signal, the second signal being used to reduce effects of ambient noise in the environment of the apparatus, and to forward the output signal to the audio output. In the second mode, the processor is arranged to generate an output signal based on the first and second signals when the apparatus is operated in the second mode.

For instance, in certain embodiments of the invention, the first mode may be a noise cancellation mode in which the second signal corresponds to the ambient noise. An anti-noise signal can be generated, based on the second signal, and combined with a third signal, such as an audio signal to be played back or a far-end speech signal of a telephone call, to be relayed via the audio output, so that a user can hear desired sounds more clearly.

Meanwhile, the second mode may be a mode in which sound is to be detected using both the first and second microphone arrangements. For example, the second mode may be a speakerphone mode, an audio recording mode or a video recording mode, in which sound might be recorded from a source that is not immediately adjacent to the apparatus. In some embodiments of the invention, the first and second microphone arrangements used for noise cancellation in the first mode can be utilised to provide a directional microphone arrangement suitable for detecting sound from such a remote source.

In such embodiments or in other embodiments, the apparatus may be configured to have a first order gradient directional sensitivity pattern. For example, the apparatus may be configured to have a direction-dependent sensitivity pattern in the form of a cardioid or super-cardioid when using the first and second microphone arrangements in the second mode. The processing performed on the first signal and/or the second signal may be configured to provide such a sensitivity-pattern.

Any of the above apparatuses may be equipped with a camera unit and the processor may be arranged to process and store the output signals and video signals generated by the camera unit in a memory. Such an apparatus may be used to provide videophone or video recording capability. In such an apparatus, the first and second microphones may be arranged along an axis of the video camera.

Any of the above apparatuses may include a sensor, arranged to produce an output indicative of the immediate environment of the apparatus. For instance, the sensor may be a photodetector arranged to measure ambient light incident on a surface of the apparatus. For example, such a sensor may determine whether the apparatus has been placed on a surface, obstructing one of the microphone arrangements. In this case, based on the sensor's output, the apparatus may be switched from the second mode, in which both the first and second microphones are used, to a third mode in which the second microphone is not used. For example, the apparatus may switch to a mode in which an alternative microphone arrangement is used. In this manner, the apparatus can switch between a directional microphone arrangement, based on the first and second microphones, and an alternative microphone arrangement, such as an omni-directional microphone, where the omni-directional microphone and second microphone are provided on different surfaces of the apparatus. Similarly, the apparatus may switch between the first mode, in which the second signal, from the second microphone arrangement, is used to compensate for ambient noise, and a third mode in which such compensation is not provided. In either or both cases, the controller may be arranged to monitor the output of the sensor and automatically switch between modes accordingly.

Alternatively, or additionally, where a recording session is to be initiated and the apparatus includes a camera unit, the sensor may be a photodetector arranged to detect a level of incoming light that would be received by the camera unit. If ambient light exceeding a predetermined threshold is detected, the controller may then determine that the recording session is to be initiated as a video recording session, in which video data is generated from the camera unit for storage in the memory. If the ambient light level detected by the sensor is below the predetermined threshold, for example, if the apparatus has been placed on a table or other surface with an aperture of the camera unit facing downwards, the controller may instead initiate an audio recording session. The controller may be arranged to monitor the output of the sensor and automatically switch between video and audio recording modes accordingly.

Any of the above apparatuses may be in the form of, or include, a mobile telephone. In such an apparatus, the third signal may be a signal received from a telecommunications network. For example, the third signal may be a far-end speech signal of a telephone call between the apparatus and a remote apparatus.

BRIEF DESCRIPTION OF THE DRAWINGS

Examples of embodiments of the present invention will now be described with reference to the accompanying drawings, in which.

DETAILED DESCRIPTION

Figure 1:
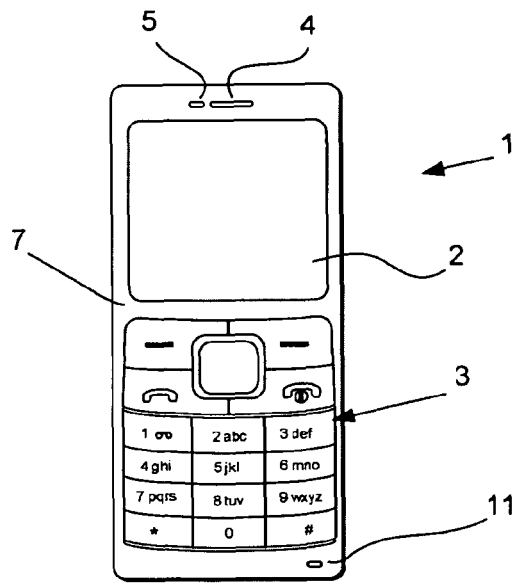
FIG. 1 is a front view of an apparatus according to an embodiment of the invention.
Figure 2:
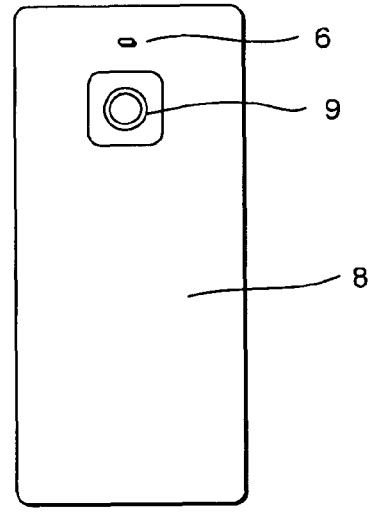
FIG. 2 is a rear view of the apparatus of FIG. 1.
Figure 3:
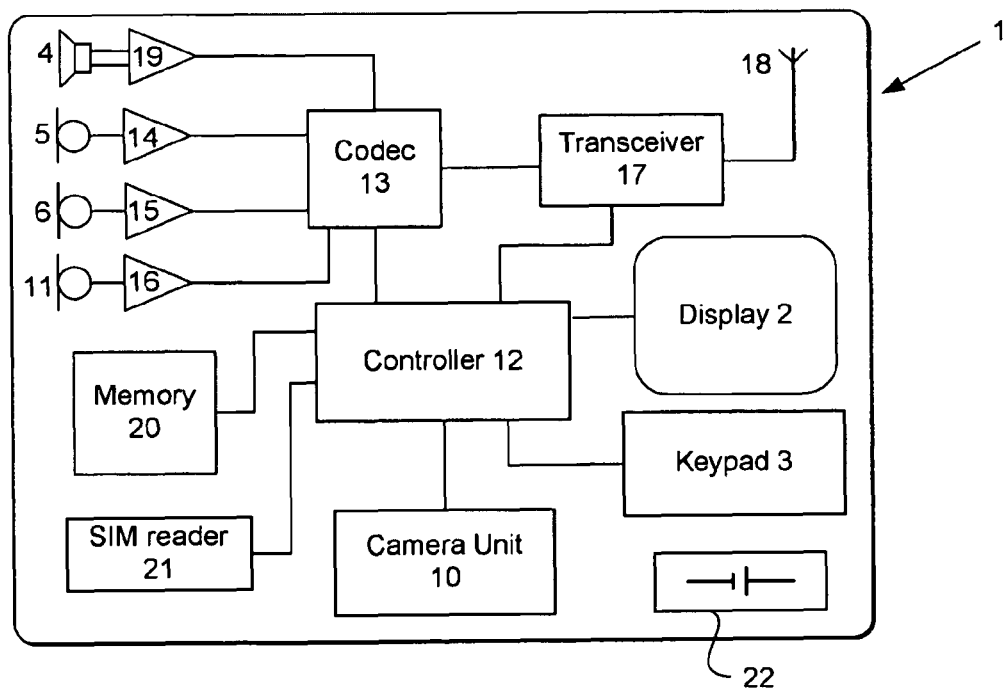
FIG. 3 is a block diagram of the apparatus of FIG. 1.

FIGS. 1, 2 and 3 depict an apparatus 1 according to an embodiment of the invention. The apparatus 1 includes a display 2, a keypad 3 and a speaker 4. First and second microphone arrangements are provided on different surfaces of the apparatus 1. In this particular example, the first and second microphone arrangements include first and second omni-directional microphones, the first microphone 5 being provided on a front surface 7 of the apparatus and the second microphone 6 being provided on the rear surface 8, along with an aperture 9 of a camera unit 10.

In this embodiment, the apparatus 1 is in the form of a mobile telephone device, the speaker 4 is an earpiece speaker and a third omni-directional microphone 11 is provided on the front surface 7. When the apparatus 1 is held by a user so that the speaker 4 is adjacent to their ear, the third microphone 11 is positioned near their mouth, in order to pick up their speech. However, it is not necessary for the third microphone 11 to be positioned on the front surface 7 of the apparatus 1. In other embodiments of the invention, the third microphone 11 may be provided on other surfaces of the apparatus 1 instead of the front surface 7, such as an edge surface extending between the front surface 7 and rear surface 8. In addition, as discussed below, at least one second speakers can be provided in addition to the earpiece speaker 4.

The operation of the apparatus 1 is controlled by a controller 12, such as a processor. The apparatus 1 also includes a codec 13 configured to digitize and process signals generated by the microphones 5, 6, 11 and amplified by respective amplifiers 14, 15, 16. The processed microphone signals may be forwarded to a transceiver 17 for transmission via antenna 18 to a wireless communication network. The codec 13 may also process signals received from a communication network via the transceiver 17 for amplification by an amplifier 19 and output using the speaker 4.

The controller 12 may also store signals output by the codec 13 or camera unit 10 in a memory 20. In particular, the apparatus 1 may provide a video recording facility where video signals generated by the camera unit 10 are stored in conjunction with associated processed microphone signals derived from one or more of the microphones 5, 6, 11.

In this particular example, the apparatus 1 is a mobile telephone device, as noted above, which includes a Subscriber Identification Module reader 21 and is powered by a battery 22.

Figure 4:
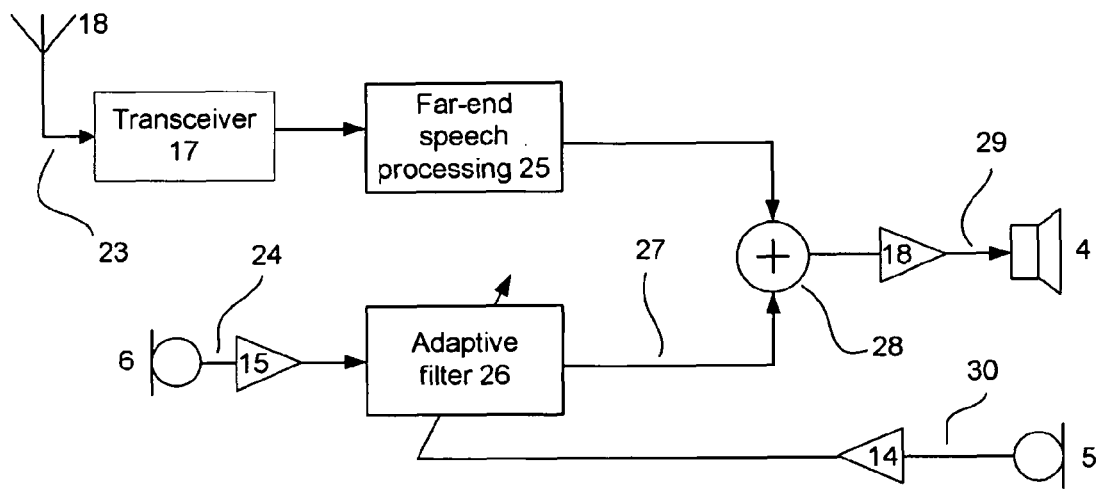
FIG. 4 is a signal flow diagram of the apparatus of FIG. 1 when operating in a first mode.
Figure 5:
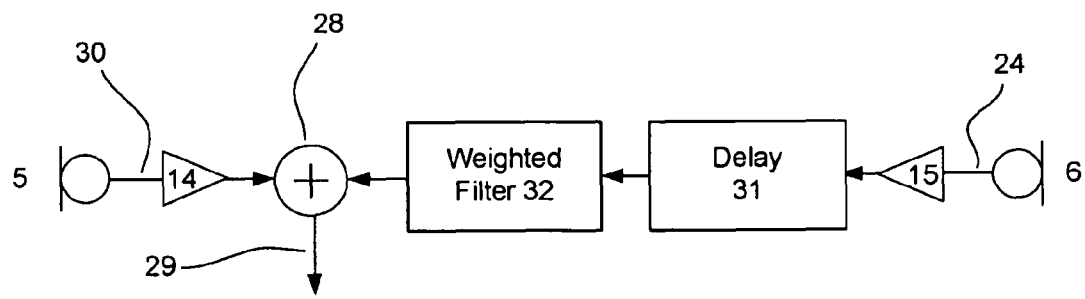
FIG. 5 is a signal flow diagram of the apparatus of FIG. 1 when operating in a second mode.

The controller 12 and codec 13 are arranged to process signals in different manners, according to an operational mode of the apparatus 1, as shown in FIGS. 4 and 5.

In a first operational mode of the apparatus 1, a noise cancelling function is provided. If the apparatus 1 is used to make a telephone call, a user may hold the apparatus 1 so that the speaker 4 is close to their ear or, in a speakerphone mode, so that the front surface 7 and, therefore, the speaker 4 and first microphone 5, is facing them. In either position, the third microphone 11 is orientated towards the user in order to pick up their speech. However, the second microphone 6, on the rear surface 8, is orientated away from the user and can detect background noise in the environment of the apparatus 1.

FIG. 4 depicts the processing of signals for output by the speaker 4 when the apparatus 1 is used in the first operational mode. The signal 23 received by the transceiver 17 is referred to below as a far-end signal and, where the apparatus 1 is being used for telephone communications, may represent the speech of a remote user. The signal 24 generated by the second microphone 6 is referred to as a background noise signal.

A far-end signal 23 is received by the transceiver 17 via the antenna 18 and processed by a module or function 25. Meanwhile, the background noise signal 24 from the second microphone 6 is amplified and fed into an adaptive filter 26. The adaptive filter 26 generates an "anti-noise" signal 27 based on the background noise signal 24, the anti-noise signal 27 being configured to cancel out ambient noise detected by the second microphone 6 in audio output from the speaker 4. The processed far-end signal 23 and the anti-noise signal 27 are combined by an adder 28 or other combination function, to produce an output signal 29 for the speaker 4 in which the effects of background noise in the environment of the apparatus 1 is reduced or even removed.

The signal 30 generated by the first microphone 5, on the front side of the apparatus 1, can be used as an estimate of residual noise that has not been compensated for effectively by the anti-noise signal 27, to provide an error signal for tuning the adaptive filter 26.

Another example of a function for which the apparatus 1 can be operated in the first operational mode is playback of an audio or video data stored in the memory 20. In this case, the signals 30, 24 from the first and second microphones 5, 6 are processed in the same manner as described above with reference to FIG. 4 to provide an anti-noise signal 27 for noise cancellation. However, instead of combining the anti-noise signal 27 with a processed signal 23 received via the antenna 18, the anti-noise signal 27 is combined with a processed signal 23 based on the audio or video data retrieved from the memory 20. Such playback may be provided using the speaker 4.

In other embodiments, a second speaker may be provided, as noted above. For instance, where the apparatus 1 is a mobile telephone, such a second speaker may be provided for "hands-free" operation and/or playback. In such embodiments, noise cancellation can be provided in the first mode for signals output by such a second speaker.

In the second operational mode, the first and second microphones 5, 6 are used to detect speech, or other desired sounds in addition to, or instead of, the third microphone 11. As shown in FIG. 5, the signals 30, 24 generated by the first and second microphones 5, 6 are amplified by their respective amplifiers 14, 15. A delay function 31 and a frequency-dependent weighted filter 32 are used to process the signal 24 from at least one of the microphones 6.

Figure 6:
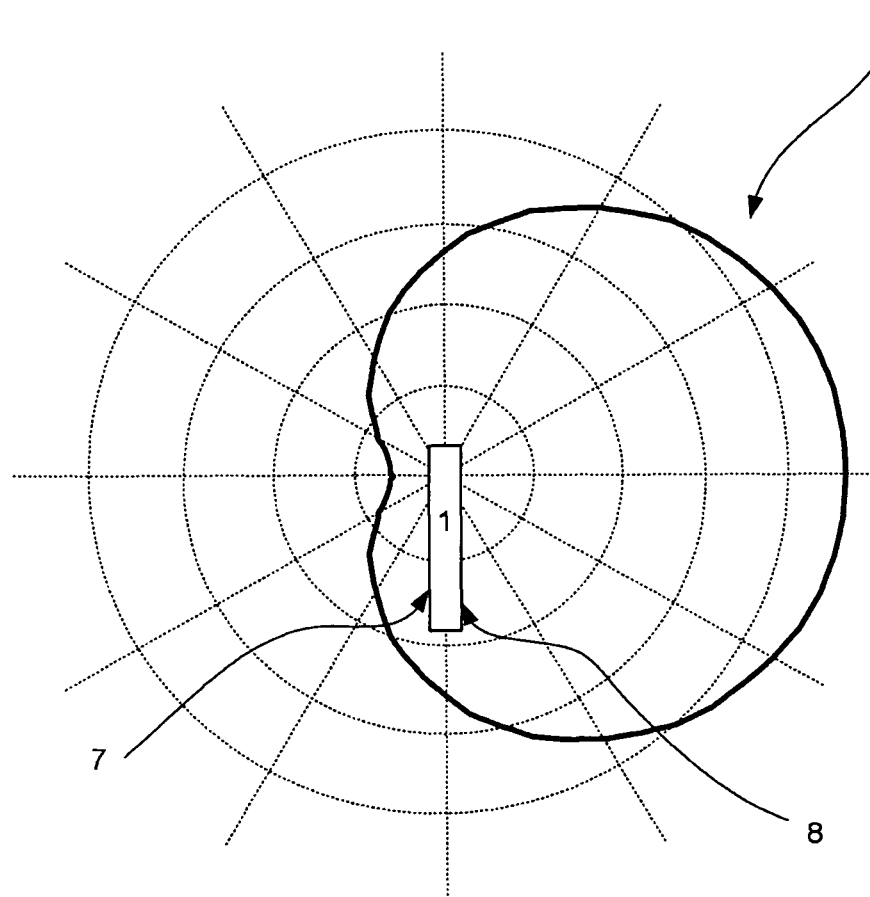
FIG. 6 is an example of a direction-dependent sensitivity pattern of a microphone arrangement of the apparatus of FIG. 1 when operating in the second mode.
Figure 7:
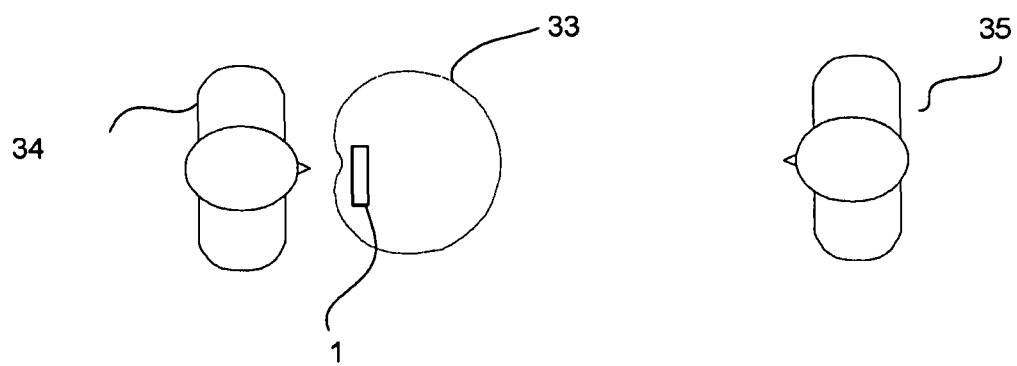
FIG. 7 depicts the apparatus of FIG. 1 being used in the second mode.

The microphones 5, 6, the delay function 31 and weighted filter 32 are arranged to achieve a desired direction-dependent sensitivity. This arrangement, combined with the configuration of the delay function 31 and weighted filter 32 provides a direction-dependent sensitivity pattern in the shape of a cardioid 33, as shown in FIGS. 6 and 7. However, in other embodiments, the delay function 31 and weighted filter 32 may be configured to provide a different direction-dependent sensitivity pattern 33, such as a pattern having a super-cardioid shape or another first order gradient pattern. Moreover, in other examples, a signal from the third microphone 11 may be used in combination with the signals 30, 24 from the first and second microphones 5, 6 to provide desired directionality.

The sensitivity pattern 33 shown in FIG. 6 is configured to provide greater sensitivity to the rear of the apparatus 1. Such a direction-dependent sensitivity can be advantageous in an audio- or video-recording function where a subject being recorded may be located at a distance from the apparatus 1.

FIG. 7 depicts an example in which a user 34 is making a video-recording of a remote subject 35, such as another person. In this particular example, the first and second microphones 5, 6 are arranged parallel to an axis of the camera unit 10 and so that, as the user 34 positions the apparatus 1 so that the aperture 9 on the rear surface 8 faces the subject 35 and, as a result, the direction in which the apparatus 1 has enhanced sensitivity is orientated towards the subject 35. Should the user 34 wish to record another subject, the apparatus 1 would then be repositioned so that the aperture 9 is orientated towards the new subject. Such repositioning would also change the direction in which the apparatus 1 has enhanced sensitivity accordingly.

In this example, the amplified signal 30 from the first microphone 5 and the processed signal 24 from the second microphone 6 are then combined, for example, using an adder 28, to form an output signal 29. As noted above, in other examples, a signal from the third microphone 11 may be obtained and used in combination with the signals from the first and second microphones 5, 6. For instance, in the example of FIG. 7, the third microphone 11 may be used to pick up speech from the user 34.

Where the second operational mode is an audio recording mode, the output signal 29 is stored in memory 20. If the second operational mode is a video recording mode, the output signal 29 is stored in the memory 20 in conjunction with a video signal generated by the camera unit 10.

Figure 8:
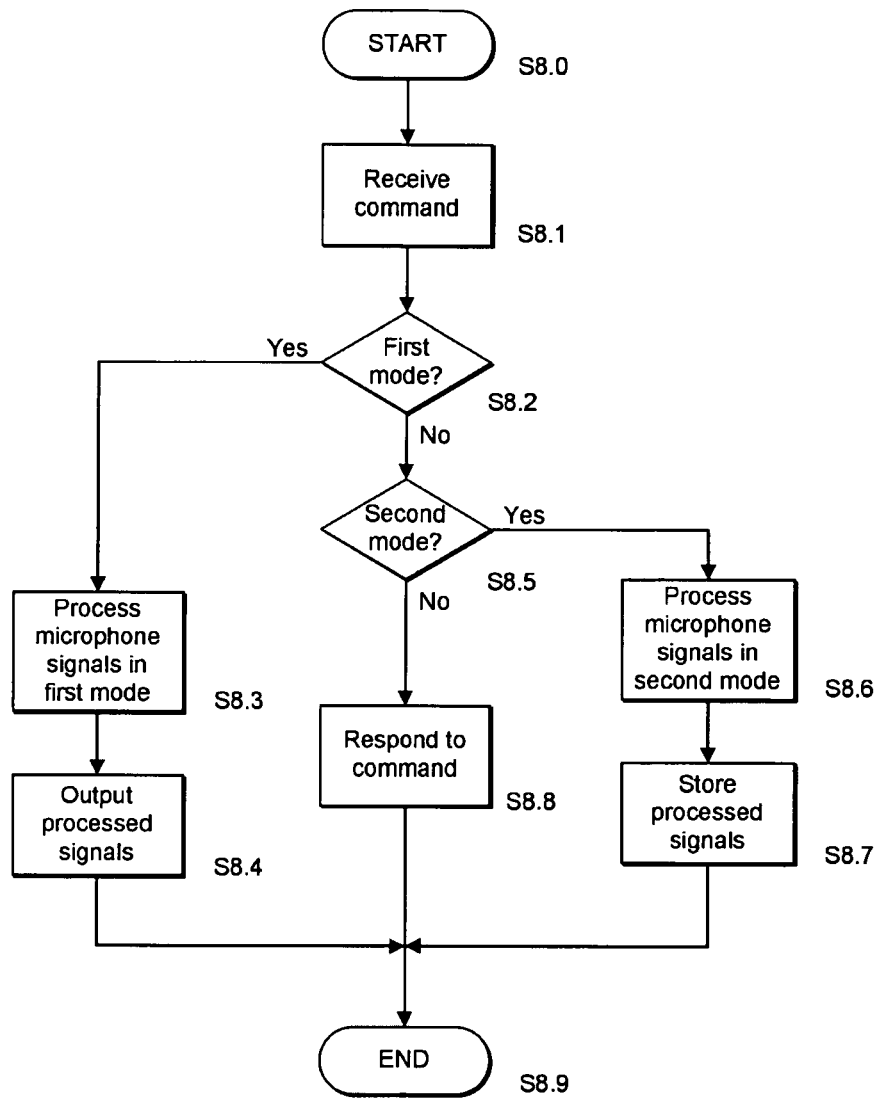
FIG. 8 is a flowchart depicting a method of operating the apparatus of FIG. 1.

FIG. 8 depicts a method of operating the apparatus 1. Starting at step s8.0, a user command is received (step s8.1). For instance, a user may request the initiation of a telephone call, the acceptance of an incoming telephone call, an audio or video recording session or playback of an audio or video recording by inputting a command using the keypad 3.

The controller 12 determines whether noise cancellation is required and, consequently, whether the apparatus 1 is required to operate in the first mode (step s8.2). If so, the signals 30, 24 from the first and second microphones 5, 6 are processed as discussed above in relation to FIG. 4 (step s8.3). For example, the controller 12 may determine that in the event of a telephone call being established, the signals 30, 24 from the first and second microphones 5, 6 are to be used to reduce the effects of ambient noise in a third signal, in this example the far-end signal 23 received by the transceiver 17, and the resulting output signal 29 is output via the speaker 4 (step s8.4). Alternatively, the controller 12 may determine whether noise cancellation is required according whether it has been requested by a user, based on user input such as a command received via the keypad 3 or a voice command through the third microphone 11. If noise cancellation is not required (step s8.2), then the controller 12 determines whether the apparatus 1 is required to operate in the second mode (step s8.5). This determination may be based on whether the user has initiated an operation in which a directional microphone arrangement might be required, such as a video recording session. Alternatively, or additionally, the determination may be based on whether a command requesting such directionality has been received via the keypad 3 or the third microphone 11.

If the controller 12 determines that the second mode is required (step s8.5), the signals 30, 24 from the first and second microphones 5, 6 are processed in the manner shown in FIG. 5 and, if required, stored (step s8.7). Where the command received in step s8.1 related to the initiation of a video recording, the storing may include storing video signals obtained from the camera unit 10. If neither the first nor second mode are required, (steps s8.2, s8.5), the apparatus 1 responds to the command as required (step s8.8). This may occur where the command requests the initiation an application that does not require noise cancellation or a directional microphone arrangement. For example, a user may wish to use the apparatus 1 to make an audio recording of their own speech, as a "voice memo", in which case the controller 12 may process signals from the third microphone 11 only, without utilising the first and second microphones 5, 6.

The process ends (step s8.9) when the first or second mode is no longer required or, where the command received at step s8.1 did not require the first or second mode, the response in step s8.8 is completed. For instance, the process may end (step s8.9) when a telephone call or audio/video recording session is terminated.

Figure 9:
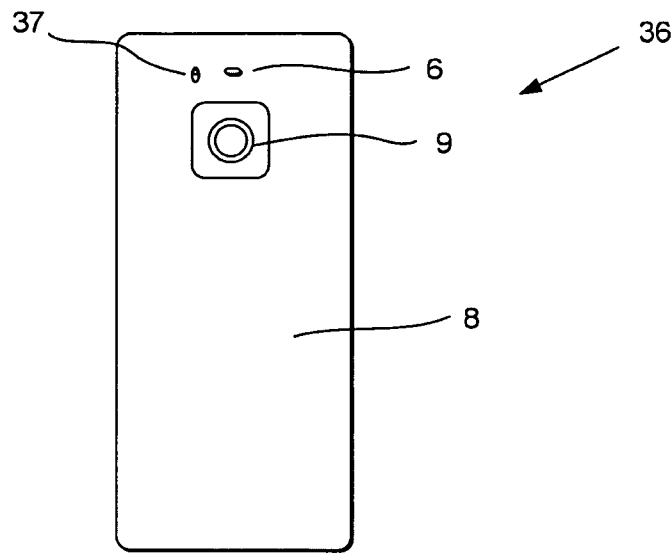
FIG. 9 is a rear view of an apparatus according to another embodiment of the invention.
Figure 10:
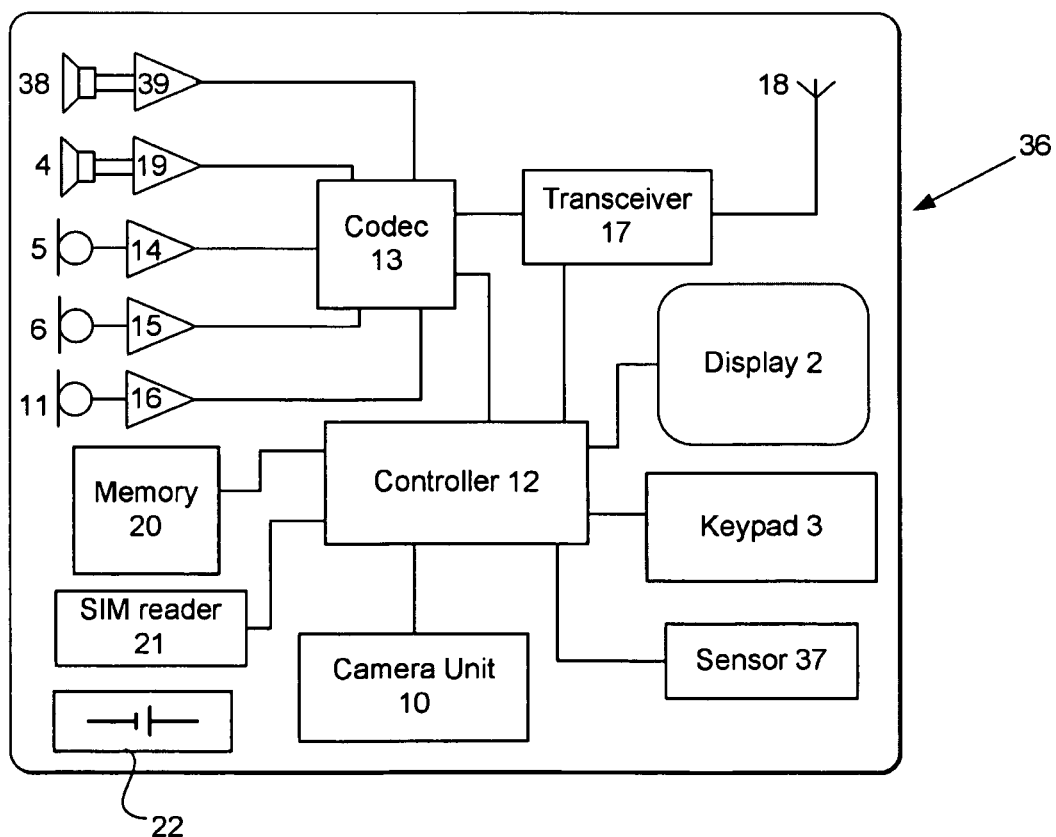
FIG. 10 is a block diagram of the apparatus of FIG. 9.

FIGS. 9 and 10 depict an apparatus 36 according to another embodiment of the invention, which differs from the apparatus 1 of FIG. 1 by the provision of a sensor 37. In addition, a second speaker 38 and corresponding amplifier 39 is provided, through which signals from the codec 13, such as audio signals to be played back or from a telephone call, can be output.

In this embodiment, the controller 12 is arranged to use an output from the sensor 37 to determine how signals from the first, second and third microphone arrangements are to be processed.

In this particular embodiment, the sensor 37 is a photodetector provided on the rear surface 8 of the apparatus 36, arranged to detect an ambient light level. The sensor 37 may be shared with, or form a component of, the camera unit 10, so that photographic parameters such as exposure time or ISO speed can be set according to the detected light level. Alternatively, the sensor 37 may be provided and operated independently from the camera unit 10.

In this example, the sensor 37 outputs a voltage having a level that corresponds to the amount of light it has detected. The controller 12 compares the voltage output by the sensor 37 with a predetermined threshold to determine whether the sensor 37 is detecting ambient light and, therefore, whether the second microphone 6 can be used to detect sound. For example, if a user is holding the apparatus 36 in the same position as the user 34 is holding the apparatus 1 in FIG. 7, the output of the sensor 37 will generate a voltage that exceeds the predetermined threshold, indicating that the second microphone 6 can be used for noise cancellation, in the first operational mode, or to detect sound from a subject 35 for recording purposes. The controller 12 can respond to such a sensor output by causing the signals 30, 24 from the first and second microphones 5, 6 to be processed in the first mode or the second mode. However, if, instead, the apparatus 36 is placed with its rear surface on a table, the voltage generated by the sensor 37 may fall below the predetermined threshold, indicating the absence of ambient light. The controller 12 may then determine that the second microphone 6 should not be used to detect sound and then switch to another mode, in which only the signal from the third microphone 11 is processed and stored.

In other words, the controller 12 can automatically switch between an omni-directional microphone arrangement, based on the third microphone 11, and a mode using the first and second microphones 5, 6, such as the first and second modes, respectively, depending on the output of the sensor 37. Also, in the same manner, where a recording is being made, the controller 12 may switch between an omni-directional microphone arrangement and a directional microphone arrangement, based on the output of the sensor 37.

Furthermore, in embodiments where the sensor 37 and an aperture 9 of a camera unit 10 are located on the same surface 8 of the apparatus 36, the controller 12 may be arranged to switch between video recording, in which an output signal 29 generated by processing signals from the first and second microphones 5, 6 in the second mode is stored in conjunction with an image signal obtained from the camera unit 10, and audio recording, when the apparatus 36 is operating in the other mode to generate an output signal by processing the signal from the third microphone 11, based on the output of the sensor 37.

The operation of the apparatus 36 will now be described, with reference to FIG. 11. Beginning at step 11.0, a session, such as a telephone call or a recording session, is started (step s11.1), following the receipt of a user command.

During the session, the output of the sensor is monitored (step s11.2) to determine whether the second microphone arrangement can be used (step s11.3). For example, if the apparatus 36 is placed on a table or otherwise positioned with its rear surface 8 obstructed, the sensor 37 may fail to detect ambient light, the voltage output from the sensor 37 will then be below a predetermined threshold, the controller 12 may determine that the second microphone 6 should not be used. On the other hand, if the apparatus 36 is held to the ear of a user 34 or so that the aperture 9 is facing a subject, the sensor 37 will detect an ambient light level, the resulting voltage may exceed the predetermined threshold and the controller 12 may determine that the second microphone arrangement can be used to detect sound.

If it is determined that the second microphone arrangement can be used to detect sound (step s11.3), the controller 12 determines whether the apparatus 36 is operating in the first mode (step s11.4), and the signals from the first and second microphones 5, 6 are processed (step s11.5) and output (step s11.6) to provide noise cancellation in a signal for output via the earpiece speaker 4 or second speaker 38, as described above in relation to steps s8.3 and s8.4 of FIG. 8. If, instead, the apparatus 36 is operating in the second mode (step s11.4), the first and second microphones 5, 6 are treated as a directional microphone arrangement. The signals from the first and second microphones 5, 6 are then processed (step s11.7) and stored (step s11.8) as described above in relation to steps s8.6 and s8.7 of FIG. 8.

If it is determined, based on the output of the sensor 37, that the second microphone arrangement should not be used to detect sound (step s11.3), the signal from the third microphone 11 is processed (step s11.8) and stored in the memory 20 (step s11.9). In other words, the apparatus 36 utilises an omni-directional microphone arrangement.

The steps of monitoring the output of the sensor 37 and processing signals from the microphones 5, 6, 11 accordingly (steps s11.2 to s11.6 or s11.2 to s11.9) until the session finishes (step s11.10) and the process ends (step s11.1).

In this manner, the apparatus 36 can switch between a directional microphone arrangement and an omni-directional microphone arrangement automatically. Alternatively, or additionally, the apparatus 36 can also switch automatically between a video recording mode and an audio recording mode.

In the above described embodiments, the first and second microphone arrangements can be used in different manners, in the provision of noise cancellation and enhanced directional sensitivity as required. Such an arrangement can permit such functions to be provided while avoiding the need for separate, dedicated, microphone arrangements. In addition, the use of multiple microphones 5, 6 in this manner can enhance the sensitivity and, hence, the quality, of audio or video recordings by a multifunctional device, such as a mobile telephone.

Although the above described embodiments utilised only two microphones 5, 6 for noise cancellation, other embodiments of the invention may be devised in which three or more microphone arrangements are provided and utilised in the above described manners, not including the third microphone 11.

Moreover, either or both of the first and second microphone arrangements, and/or any further microphone arrangements, may include a plurality of microphones instead of the first and second microphone 5, 6 referred to hereinabove. The one or more array of microphones may be arranged to provide a particular directional sensitivity of the apparatus 1 in conjunction with the processing performed by the controller 12 and/or codec 13. The use of such an array or arrays can increase the range of direction-dependent sensitivity patterns that can be achieved.

Figure 11:
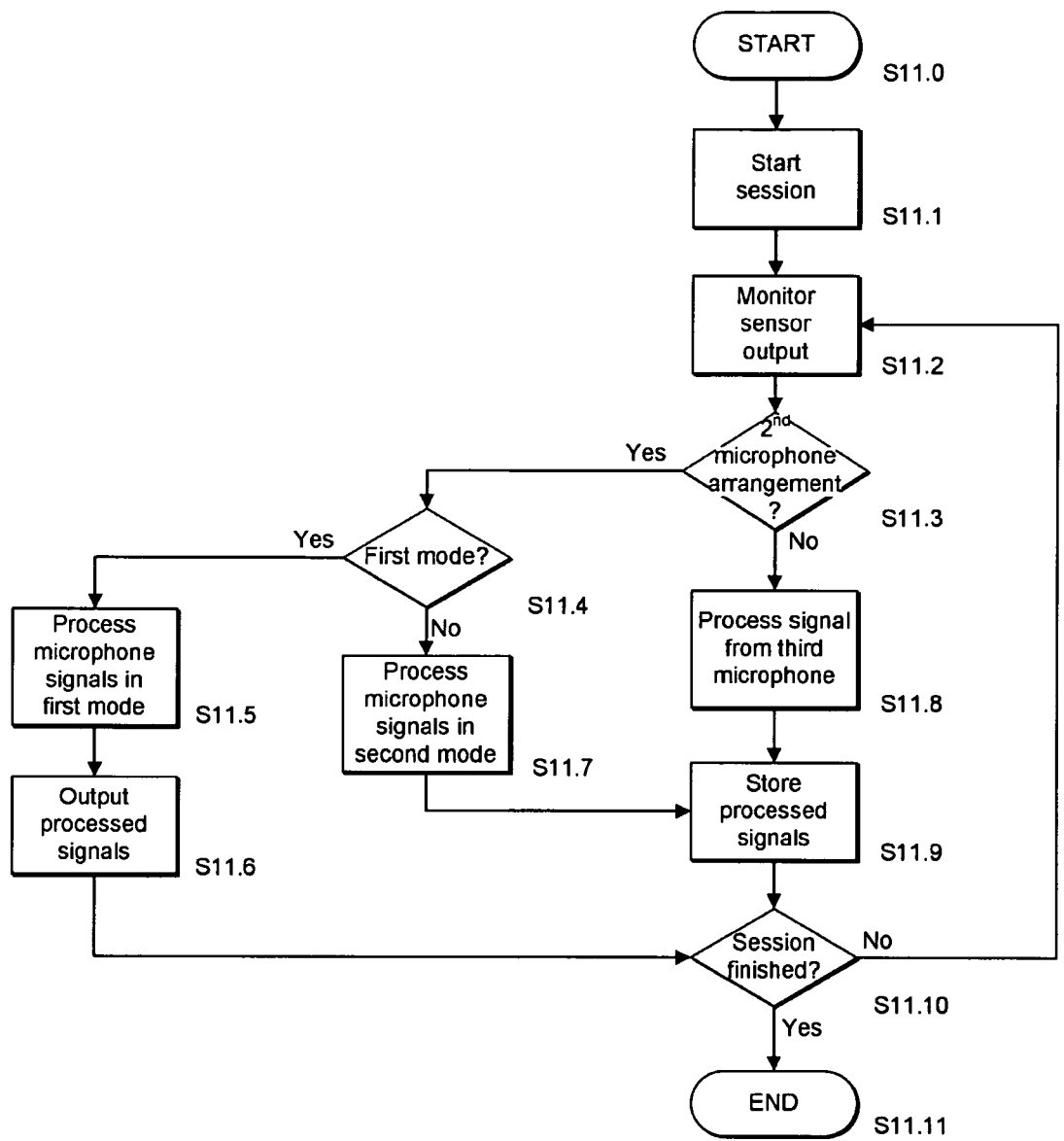
FIG. 11 is a flowchart depicting a method of operating the apparatus of FIG. 9.

The embodiment of FIGS. 9 to 11 included a sensor 37 in the form of a photodetector for detecting ambient light. However, if required, more than one sensor can be provided. Moreover, other sensors may be used in addition to, or instead of, a photodetector in order to determine whether a directional or omni-directional microphone arrangement is to be provided, which operational mode should be selected and/or whether a particular type of recording is to be made. For example, an orientation sensor may be provided to determine whether or not the apparatus 36 is held upright. An accelerometer could be provided which generates three dimensional coordinates. Those coordinates, if within a predetermined range, could be used to indicate that the rear surface 8 is facing downwards and that the camera unit 10 and/or the second microphone 6 cannot be used. Alternatively, or additionally, the camera unit 10 may include an automatic focussing arrangement in which the contrast in an image based on light received through the aperture 9 is analysed to determine the correct focus. If the aperture 9 is positioned against a surface, for example if the apparatus 36 is placed on a table with its rear surface 8 facing downwards, the camera unit 10 will not be able to focus. Such an arrangement could, therefore, be used in place of, or to complement, the sensor 37.

While the embodiments described with reference to FIGS. 1 to 11 are mobile telephone devices, other embodiments may be provided within, or take the form of, other types of multifunctional electronic devices capable of audio input and output and/or playback. For instance, while the second mode of operation in the above described embodiments relates to the recording of audio or video input, the second mode of operation may alternatively or additionally provide speakerphone functionality for the apparatus, where the output signal 29 is transmitted via the transceiver 17 and antenna 18 instead of being stored in the memory 20. Similarly, while the description of the operation of the above embodiments in the first mode referred to generating an audio output via a speaker 4, in other embodiments the output signal 29 may forwarded be forwarded to another type of audio output, such as a headset or headphones connected to the apparatus over a wired or wireless connection. Such an audio output may be provided in addition to, or instead of, a speaker 4, 38.

The invention claimed is:

1. An apparatus including:
   first and second microphone arrangements, arranged to output first and second signals respectively;
   an audio output;
   a controller arranged to generate an output signal;
   wherein the apparatus is operable in a first mode and a second mode, each mode based on the first and second microphone arrangements; and
   wherein the controller is arranged to:
   when the apparatus is operated in the first mode, generate the output signal based on the first and second signals, wherein the first and second signals are used together to compensate for ambient noise in an environment of the apparatus, and forward the output signal to the audio output; and
   when the apparatus is operated in the second mode, generate the output signal based on the first and second signals, wherein the apparatus is configured to provide a sensitivity pattern based on the first and second signals in the second mode.

2. An apparatus according to claim 1, wherein the controller is configured to use an adaptive filter to generate an anti-noise signal based on the second signal and to tune the adaptive filter according to the first signal when the apparatus is operated in the first mode.

3. An apparatus according to claim 1, wherein said sensitivity pattern is a first order gradient pattern.

4. An apparatus according to claim 3, wherein said first order gradient pattern is a cardioid or super-cardioid.

5. An apparatus according to claim 1, comprising:
   a camera unit; and
   a memory;
   wherein:
   the controller is operable to store the output signal and video data generated by the camera unit in the memory.

6. An apparatus according to claim 5, wherein the first and second microphone arrangements are arranged parallel to an axis of the camera unit, and wherein the arrangement of the first and second microphone arrangements parallel to the axis of the camera-unit provides an increased sensitivity to an audio source located remotely from the apparatus and in a direction of an aperture of the camera unit.

7. An apparatus according to claim 5, comprising a sensor, wherein:
   the controller is arranged to determine, based on an output of the sensor, whether to generate video data from the camera unit for storage in the memory.

8. An apparatus according to claim 1, comprising a sensor, wherein the controller is arranged to determine, based on an output of the sensor, at least one of:
   whether the apparatus is to process the first and second signals or to operate in a third mode in which a third signal from a third microphone arrangement is processed; and
   whether the apparatus is to operate in the first mode or in the third mode.

9. An apparatus according to claim 8, wherein the third microphone arrangement provides an omni-directional sensitivity pattern when the apparatus is operated in the third mode.

10. An apparatus according to claim 8, wherein the sensor is a photodetector.

11. An apparatus according to claim 1, wherein the apparatus is a mobile telecommunications device, and wherein the controller is arranged to, when the apparatus is operated in the first mode, generate the output signal based on the first and second signals and a third signal that is received from a telecommunications network.

12. A method comprising:
   operating an apparatus in first and second modes, wherein the apparatus has first and second microphone arrangements arranged to output first and second signals, respectively, and wherein the first and second modes are each based on the first and second microphone arrangements;
   when the apparatus is operated in the first mode, generating an output signal based on the first and second signals, wherein the first and second signals are used together to compensate for ambient noise in an environment of the apparatus, and forwarding the output signal to an audio output; and
   when the apparatus is operated in the second mode, generating another output signal based on the first and second signals, wherein the apparatus is configured to provide a sensitivity pattern based on the first and second signals in the second mode.

13. A method according to claim 12, wherein:
   the generating of the output signal when the apparatus is operated in the first mode includes using an adaptive filter to generate an anti-noise signal based on the second signal;
   the method comprising tuning the adaptive filter based on the first signal.

14. A method according to claim 12, comprising:
   obtaining a video signal from a camera unit of the apparatus; and
   storing the output signal and the video signal in a memory of the apparatus.

15. A method according to claim 12, comprising:
   obtaining an output from a sensor; and
   determining, based on the sensor output, at least one of:
   whether the apparatus is to generate video data from a camera unit for storage in a memory;
   whether the apparatus is to operate in the second mode or in a third mode wherein, in the third mode, the output signal is based on a third signal from a third microphone arrangement; and
   whether the apparatus is to operate in the first mode or in the third mode.

16. A method according to claim 12, comprising:
   when the apparatus is operated in the first mode, receiving a third signal from a telecommunications network and generating the output signal based on the first and second signals and the third signal.

17. The apparatus of claim 1, wherein first and second microphone arrangements each comprise one or more microphones.

18. The apparatus of claim 11, wherein the third signal is a far-end speech signal of a telephone call.

19. The method of claim 16, wherein the third signal is a far-end speech signal of a telephone call.

20. The apparatus of claim 1, wherein the first mode is a playback mode that plays back audio previously stored in a memory as a third signal, and wherein the second mode is a video recording mode that records video from a camera and stores the output signal as a directional audio signal associated with the recorded video.

21. The apparatus of claim 1, further comprising a camera; and a memory;
   wherein the first mode is a playback mode and the controller is arranged to, when the apparatus is operated in the playback mode, generate the output signal based on the first and second signals and a third signal that is an audio signal stored in the memory or a far-end speech signal of a telephone call; and wherein the second mode is a video recording mode and the controller is arranged to, when the apparatus is operated in the video recording mode, provide enhanced audio sensitivity in the output signal, based on the first and second signals, in a direction of a remote source within a view of the camera.

22. The apparatus of claim 1, wherein the first and second microphone arrangements are configured to provide at least one of a desired directional pattern, a direction dependent pattern, and noise cancellation.

23. The method of claim 12, wherein the first and second microphone arrangements are configured to provide at least one of a desired directional pattern, a direction dependent pattern, and noise cancellation.

24. The apparatus of claim 9, wherein the apparatus is configured to, when operated in the second mode, provide the sensitivity pattern based on the first, second, and third signals.

25. The method of claim 15, further comprising:

providing, when operating the apparatus in the second mode, the sensitivity pattern based on the first, second, and third signals.

* * * * *